US007634259B2

(12) United States Patent
Shienbrood et al.

(10) Patent No.: US 7,634,259 B2
(45) Date of Patent: Dec. 15, 2009

(54) APPLICATIONS SERVER AND METHOD

(75) Inventors: Eric R. Shienbrood, Sudbury, MA (US); David M. Pelland, Bolton, MA (US); Gregory T. Howe, Brookline, MA (US); Robert Adamsky, Andover, MA (US)

(73) Assignee: Orange SA, Paris (FR)

( * ) Notice: Subject to any disclaimer, the term of this patent is extended or adjusted under 35 U.S.C. 154(b) by 477 days.

(21) Appl. No.: 11/378,579

(22) Filed: Mar. 17, 2006

(65) Prior Publication Data

US 2006/0212515 A1 Sep. 21, 2006

(51) Int. Cl.
*H04M 3/00* (2006.01)

(52) U.S. Cl. .................... 455/418; 455/419; 455/422.1; 709/203

(58) Field of Classification Search ................. 455/418, 455/419, 422.1; 709/217, 219, 203
See application file for complete search history.

(56) References Cited

U.S. PATENT DOCUMENTS 6,999,573 B2 * 2/2006 Weaver .................... 455/404.2

(Continued)

OTHER PUBLICATIONS

Augustine Tsai et al.,"Dialogue Session Management Using VoiceXML," p. 2213-2216, Eurospeech-2001, Sep. 7, 2001.

(Continued)

*Primary Examiner*—Joseph H Feild
*Assistant Examiner*—Huy D Nguyen
(74) *Attorney, Agent, or Firm*—Haverstock & Owens LLP

(57) ABSTRACT

An applications server is operable to provide a plurality of user driven services by running an application program. The application program is arranged to provide the services in response to user commands for selecting service options. The applications server comprises in accordance with the application program a state machine able to determine a current state of the application program from one of a pre-determined set of states defining a logical procedure through the user selected service options. The states of the state machine includes for each of the modular services, one or more states associated with one or more forms within the service. Each form defines a state of a user interface for providing the services to the user, and each state includes one or more sub-states called situations, defining the commands to be recognised and the predicates to be satisfied to select that state depending upon the estimated user commands and the session state of the user session. The set of states includes a base service defined by one or more main states. The application program also comprises a command recognition engine, including a grammar processor and may include an automatic speech recogniser to provide the command recognition engine with a set of possible user commands which may be provided for a particular state, the possible commands determining the states which may be reached from the current state. The command recognition engine, in response to a received user command, provides the state machine with an estimate of at least one of the possible commands, which the user may have provided. The state machine changes state in response to the estimated user command. The state machine determines the transitions between the states at run-time and the grammar engine adapts the possible user commands to be recognised for a current state in association with the state transitions, which are determined at run-time. As such, the applications server can provision user driven services, which can be dynamically adapted and blended with each other in accordance with user requirements.

20 Claims, 11 Drawing Sheets

U.S. PATENT DOCUMENTS

| | | | | |
|---|---|---|---|---|
| 2002/0173339 | A1 * | 11/2002 | Safadi | 455/553 |
| 2004/0091095 | A1 * | 5/2004 | Weaver | 379/211.02 |
| 2004/0116102 | A1 * | 6/2004 | Weaver | 455/405 |
| 2004/0202304 | A1 * | 10/2004 | Weaver | 455/414.1 |
| 2005/0038581 | A1 * | 2/2005 | Kapolka et al. | 701/29 |
| 2006/0288085 | A1 * | 12/2006 | Alam et al. | 709/218 |

OTHER PUBLICATIONS

Lionel Lavallee,"Integrating VoiceXML and an Application Server: A Case Study", Sep. 2001, p. 1-12., http://www.voicexmireview.org/Se...atures/integrating_voicex.

"VoiceXML", Andreas Angstrom et al., Jun. 9, 2004, pp. 1-26, http://www.it-universitetet.kth.se/courses/2G1325/2g1325-jsv-VoiceXML_Updated-20040609.pdf> retrieved on Feb. 22, 2006.

"Answers to Your Questions About VoiceXML", Jeff Kunins, pp. 1-4, Retrieved from Internet May 2001, http://www.voicexmlreview.org/May2001/columns/May2001_speak_listen.html>.

"Using MVC Pattern in Web Interactions", David J. Anderson, pp. 1-22, Jul. 22, 2000, http://www.uidesign.net/Articles/Papers/UsingMVCPatterminWebInteractations.

* cited by examiner

| | 222 Dialog State | 224 Condition | 226 Situation ID | 228 Prompt Suggestion | 230 Action | 232 Transition |
|---|---|---|---|---|---|---|
| 204.1 | <empty> | | VoiceDialing.Call.NeedNameAndPlace | "Call whom?" | | ask for Person+Place |
| 206.1 | filled Place | recog confidence < 0.9 | VoiceDialing.Call.CallPlaceConfirm | "<place> - Is that correct?" | | goto ConfirmCall |
| 208.1 | filled Place | recog confidence >= 0.9 | VoiceDialing.Call.CallPlace | "Placing call to <place>" | initiate call | goto Background |
| 210.1 | filled Person | contact has 1 number & recog confidence >= 0.9 | VoiceDialing.Call.CallPerson | "Placing call to <person>" | initiate call | goto Background |
| 212.1 | filled Person | contact has > 1 number | VoiceDialing.Call.NeedPlace | "Call <person> at which place?" | | ask for Place |
| 214.1 | filled Person filled Place | contact has > 1 number & recog confidence < 0.9 | VoiceDialing.Call.ConfirmCallPersonPlace | "<person> at <place> - Is that correct?" | | goto ConfirmCall |

Fig. 5

From "NoFire" base service:

```
<FORM name="TopLevel" type="dialog">                                    900
    <IDLESTATE/>                                                        905
    <SITUATION name="PromptForNoFireCommand">
        <OPERATION>
            <PROMPT>                                                    914
                <COMMENT><![CDATA[We are at the top.  Say "Let's work with" for
things like Messages or Contacts, or say "What are my options".]]></COMMENT>   912
            </PROMPT>
            <TRANSITION>
910             <ASK>
                    <RULE id="TopLevel" package="NoFire"/>              916
                </ASK>
            </TRANSITION>
        </OPERATION>
    </SITUATION>
    <SITUATION name="NoFireWWW">
        <CONDITION>
            <FORMSTATE>                                                 924
                <FIELDS name="NoFire_EndOfTask" operator="equals"
value="WhereWereWe"/>                                                   922
            </FORMSTATE>
        </CONDITION>
        <OPERATION>
            <ACTION>
920             <FIELDS name="NoFire_EndOfTask" operator="clear"/>      928
            </ACTION>
            <PROMPT>                                                    912
                <COMMENT><![CDATA[We're ready to get some work done.  Your wish is
my command.]]></COMMENT>
            </PROMPT>                                                   929
            <TRANSITION>
                <ASK>
                    <RULE id="TopLevel" package="NoFire"/>
                </ASK>
            </TRANSITION>
        </OPERATION>
    </SITUATION>
    <SITUATION name="NoFireWAMOTopLevel">
        <CONDITION>
            <FORMSTATE>
                <FIELDS name="NoFire_Global" operator="equals"
value="WhatAreMyOptions"/>                                              932
            </FORMSTATE>
        </CONDITION>
        <OPERATION>
            <ACTION>
                <FIELDS name="NoFire_Global" operator="clear"/>         934
            </ACTION>
930         <PROMPT>
                <COMMENT><![CDATA[Your options are:

<list everything from WorkItemGeneral grammar>
<list other services active grammar items>
That'll be all for now
Good-bye Wildfire
Help]]></COMMENT>
            </PROMPT>
            <TRANSITION>                                                938
                <ASK>
                    <RULE id="TopLevelWAMOAndLWW" package="NoFire"/>    936
                </ASK>
            </TRANSITION>
        </OPERATION>
    </SITUATION>
</FORM>
```

Fig. 9A

From VoiceDialing service:

```
<FORM name="TopLevel" package="NoFire" type="dialog">  950
   <SITUATION name="SaidCallCmd">  952
      <CONDITION>
         <FORMSTATE>  960
962         <ALLOF>
               <FIELDS name="NoFire_TopLevel" operator="equals" value="Call"/>   955
964            <FIELDS name="ZERO-OR-MORE" operator="equals" value="ANY"/>
            </ALLOF>
         </FORMSTATE>
970      <PREDICATE>
            <INVOKE name="isNull" package="Common">
972            <ARGUMENT source="fields" value="NoFire_BasicPlaces"/>   965
            </INVOKE>
         </PREDICATE>
      </CONDITION>
      <OPERATION>
         <ACTION>
982         <INVOKE codename="gaveDigitsByVoiceResultCode"
               name="gaveDigitsByVoice" package="Common"
               resultname="PassedByVoice"/>
984         <INVOKE
               codename="stashFieldNameMapIfFilledResultCode"
               name="stashFieldNameMapIfFilled" package="Common">
986            <ARGUMENT value="VoiceDialing.CallCmd"/>   980
988            <ARGUMENT value="VoiceDialing.CallCmd"/>
            </INVOKE>
            <FIELDS name="VoiceDialing_CallCmd" operator="set"
               source="fields" value="NoFire_TopLevel"/>
            <FIELDS name="NoFire_TopLevel" operator="clear"/>
         </ACTION>
989      <PROMPT>
            <COMMENT><![CDATA[<none>]]></COMMENT>
         </PROMPT>
         <TRANSITION>
992         <GOTO form="MainCall" package="VoiceDialing">
               <PARAM destination="VoiceDialing_CallCmd"
                  source="fields" value="VoiceDialing_CallCmd"/>
               <PARAM destination="VoiceDialing_CallArgs"
                  source="fields" value="VoiceDialing_CallArgs"/>
               <PARAM destination="VoiceDialing_PNCallArgs"
                  source="fields" value="VoiceDialing_PNCallArgs"/>
               <PARAM destination="VoiceDialing_NumStr"
                  source="fields" value="VoiceDialing_NumStr"/>
               <PARAM
                  destination="VoiceDialing_ContactCallArgs"
                  source="fields" value="VoiceDialing_ContactCallArgs"/>
994            <PARAM destination="Contacts_Contact"   990
                  source="fields" value="Contacts_Contact"/>
               <PARAM destination="VoiceDialing_Place"
                  source="fields" value="VoiceDialing_Place"/>
               <PARAM
                  destination="VoiceDialing_OnCallBackground"
                  source="fields" value="VoiceDialing_OnCallBackground"/>
               <PARAM
                  destination="VoiceDialing_OnCallForeground"
                  source="fields" value="VoiceDialing_OnCallForeground"/>
               <PARAM destination="PassedByVoice"
                  source="locals" value="PassedByVoice"/>
            </GOTO>
         </TRANSITION>
      </OPERATION>
   </SITUATION>
   <!-- ... other situations omitted ... -->
</FORM>
```

Fig. 9B

APPLICATIONS SERVER AND METHOD

FIELD OF THE INVENTION

The present invention relates to speech applications servers, which are operable to provide modular user driven services in accordance with application programs. The present invention also relates to methods for providing modular user driven services, applications programs and systems for providing user driven services.

BACKGROUND OF THE INVENTION

Menu-driven interactive services are arranged to respond to user commands to the effect of adapting the services in accordance with available service options. A service is typically adapted to perform particular actions. A user may also receive prompts from a service to indicate a set of commands, which the user is expected to provide in order to select corresponding service options. For example, the commands may be audio commands provided using audio communications devices such as telephones, and audio prompts may be provided to the user in order to guide the user through service options and to specify the services to be provided.

Audio communications is one example of a modality through which commands may be given and prompts received to select service options. Other modalities include text and graphics. Text may be conveyed using instant messaging or a Short Message Service (SMS) text messages, whereas graphics may be provided by display screens, which may display data or allow options to be selected by, for example, a touch sensitive screen. Indeed, depending on the equipment which is available to a user, more than one mode may be employed, thereby providing a facility for multi-modal services.

Services may be provided over a network, for instance a mobile network including a server, which may provide, for example, services such as initiating a telephone call, retrieving voicemail or sending and retrieving text or picture messages. User commands may take a number of different forms. For instance, users may be able to issue a command by pressing a button or a series of buttons on a keypad of a user terminal such as a mobile telephone. Alternatively, the user may be able to issue a command by navigating and selecting menu items on a graphical user interface of a user terminal, or by providing a voice command. However, the commands, which a user may give to obtain services, and the type of services which can be obtained, can depend on media types through which a user can send and receive commands and prompts in accordance with modalities which are available to the user. Furthermore the modalities available to a user may change, as a result, for example, of the user up-grading equipment through which the services are to be provided.

User driven services are provided in a modular fashion, such that each individual service is built, packaged, and deployed as a physically separate collection of software components that implement the service. This modularity provides the advantage that new services may be deployed or existing services upgraded, without having to build, package, and deploy any of the other services on a platform. This modularity also extends to the provisioning of services to users; that is, different users of the platform may subscribe to different subsets of the services of an application program, such that each user can only access the features of the set of services to which he subscribes.

A menu-driven application typically has a top-level menu, which allows the user to determine which of the application's services is to be utilised at a given point in the interaction between the application and the user. Each service also contains a hierarchy of menus that allows the user to navigate among the service options. However, when a new service is to be added to the services available to the user, the top-level menu must be extended to allow the user to navigate to the menus of the new service. Additionally, a new service may contain functionality that is complementary to the functionality of one or more existing services, in which case a new service may also logically extend or modify the menus of those existing services. Furthermore, it may be necessary to include a new set of prompts to direct the user through the new service options, and the new service option may need to interact with other service options. This is referred to as service blending. As can be appreciated, anticipating all possible service options for many different users with respect to services available to those users requires considerable complexity and implementation logic which tests all possible combinations of service options which are available to each user. Under known approaches, adding a new service requires visiting every site in the service software which is dependent on service combinations, and adding a new set of conditional logic for the new combinations which are now possible. As will be appreciated, blending services efficiently represents a technical problem.

SUMMARY OF INVENTION

According to the present invention there is provided an applications server operable to provide a plurality of modular user driven services in accordance with an application program. The application program is arranged to provide the services in response to user commands for selecting service options. The applications server comprises in accordance with the application program a state machine and a command recognition engine. The command recognition engine may include a command analysis engine, which combines with speech and DTMF recognisers residing on a telephony platform. The state machine is operable to determine a current state of the application program from one of a pre-determined set of states defining a logical procedure through the user selected service options. The states of the state machine include for each of the modular services, one or more states associated with one or more forms within the service, each form defining a state of a user interface for providing the services to the user. Each state includes one or more sub-states defining the commands to be recognised and conditions to be satisfied to select that state depending upon the estimated user commands and a current state of a user's session. The sub-states may be referred to as situations and the conditions to be satisfied to select that state may be referred to as predicates. The set of states includes a base service defined by one or more main states. The command recognition engine includes a grammar engine operable to provide the command recognition engine with a set of possible user commands which may be provided for a particular state, the possible commands determining the states which may be reached from the current state. The command recognition engine is operable to provide the state machine, in response to a user command, with an estimate of one of the possible commands provided by the grammar engine, which the user may have provided, the state machine being operable to change state in response to the estimated user command. The state machine is operable to determine the transitions between the states at run-time, the grammar engine being operable to adapt the possible user commands to be recognised for a current state in association with the transitions, which are determined at run-time.

Every application consists of at least one service, which is known as the "base" service. This service is no different than any other service the application may have, except that its presence is mandatory. It is therefore the service that defines certain basic behaviour of the application, including the top-level menu, which represents the entry-point to the application.

The conditions to be satisfied for each situation (sub state) of a state may be referred to as predicates.

Embodiments of the present invention can provide a plurality of user driven services, which can be dynamically adapted in accordance with services which are to be deployed to the user. For example, if a user subscribes to a new service, or if attributes of the user change, resulting in a new service being available to a user, then the new service can be bound into the service options at run-time. As such, services are dynamically blended at run-time, with the effect that when a new service becomes available to a user, the existing services do not require modification, nor any other form of adaptation, because the blending is performed at run-time.

Known systems have provided for modular services, or blended services, but not both. Having modular services has prevented known systems from allowing services to be blended. When a traditional platform allows services to be deployed in a modular fashion, the services typically do not extend or modify each other. Conversely, those systems which do provide blended services require that the blending be done at the time that services are developed. In these systems, the service developer typically combines the services into a "super service" in which a great deal of conditional logic is required. The conditional logic tests at run-time for all possible combinations of services to which a user can be subscribed, in order to execute appropriate code for each user's particular combination of services. Additionally, command recognition grammars must be provided for every possible combination of services, so that only the user commands allowed for each service combination will be recognized as valid. As such any change in functionality of any one of the component services requires that the entire super service be rebuilt and re-deployed. Adding a new service requires every site in the code that is dependent on service combinations to be analysed to extend the conditional logic for the new combinations that are possible. It also requires a complete new set of command recognition grammars to be constructed that reflects the different user commands that are valid for each new possible combination of services. Because these changes require access to the source code that implements the services, it generally precludes the changes from being made in the field, or by anyone other than the original developer of the services.

Embodiments of the present invention provide an arrangement in which a developer can implement a new service or upgrade an existing service, to create a package containing only items pertaining to that service. At run-time, each user can experience behaviour which corresponds to that which would be exhibited by a "super service" containing conditional logic for each possible combination of features. Furthermore, a modular service may be removed from a system without rebuilding or redeploying any of the existing services, once all users have been provisioned to no longer subscribe to that service.

According to an example embodiment, each service in the application program is provided in accordance with a set of user interface states called forms, the forms together defining a service to be provided to the user. The purpose of each form is to describe a dialog between the application and the user, the intention of which is to gather from the user information required for the service to carry out an action on behalf of the user. Each form includes a number of sub-states, which can be referred to as situations. Each situation defines a point in the dialog conducted between the service and the user, with the service prompting the user as to the set of possible user commands valid in that sub-state, and the user responding with one of the possible set of commands. The commands provided by the user cause the state machine to navigate to particular states within the form, in order to execute the option for that service defined by the state.

Each service within the application program is typically identified with respect to a state within the state machine that serves as the initial entry point to the service from the top-level menu. When a new service is to be deployed the, program code representing its state machine is added to existing executable code of the application program. Each state in the service's state machine is identified with a globally unique identifier consisting, in part, of the service name, the name of the form to which the state belongs, and the name of the state, which is known as the situation identifier. The service name portion of a state may name a service other than the one containing the state. In this way, states that are packaged with one service may add states to, or replace states of, forms in other services. In addition, appropriate grammar rules are introduced into the grammar processor to include a command or commands, which are included within the possible set of commands which can be recognised by the recognition engine. These grammar rules allow the user to navigate within the forms of the new service, but some of the rules may be associated with forms belonging to other services, thereby extending the set of possible commands available when using those services. In most cases, one of the grammars extended in this way is the one associated with the base service's top-level form, which enables a new transition from the top-level menu to the entry state of the new service.

In one example, the application program is specified using a mark-up language, the mark-up language specifying the services provided by the application program by the forms and the states within the forms. The mark-up language is translated in one example into Java code.

In some embodiments, the application program may also include a prompt selection rule set operable by a prompt selection engine to provide, for example, audio prompts for prompting the commands from the user in accordance with predetermined rules, wherein the predetermined rules determine the prompt to be selected in accordance with a current state of the state machine.

The user may provide commands in any appropriate form, such as, for example, through data signals such as DTMF tones. However, in some embodiments the command recognition engine may be operable to determine a confidence level for the estimated user command, the state machine identifying the change of state from the estimated user command in combination with the determined confidence level. This may be required for example, when the user is providing voice commands. For this example, the command recognition engine may include a speech recognition processor, operable to generate confidence levels for the estimate of a command provided by the user, the possible user commands being possible voice commands.

Advantages provided by embodiments of the present invention can be summarised as follows:

- a separate development of modular blended services can be made
- automation of installing and removing a new application service on a platform can be made even to the extent of modifying an existing service once a service is installed it can be automatically made available to users a user is automatically provided with menus, prompts, hints and other items which are appropriate to the particular combination of services to which the user has subscribed.

Various further aspects and features of the present inventions are defined in the appended claims. Other aspects of the invention include a system for providing a plurality of user driven services, a method and a computer program for providing a plurality of user driven services.

BRIEF DESCRIPTION OF THE DRAWINGS

Embodiments of the present invention will now be described by way of example only with reference to the accompanying drawings where like parts are provided with corresponding reference numerals and in which:

FIG. 5 schematically illustrates, for each of the states of FIG. 4 a corresponding condition for reaching that state, a situation identifier, a prompt suggestion, an action and a next state to be reached following the present state;

FIGS. 9A and 9B schematically illustrate example code fragments for a base service and a voice dialing service in a user interface mark-up language.

DESCRIPTION OF THE EXAMPLE EMBODIMENTS

Figure 1:
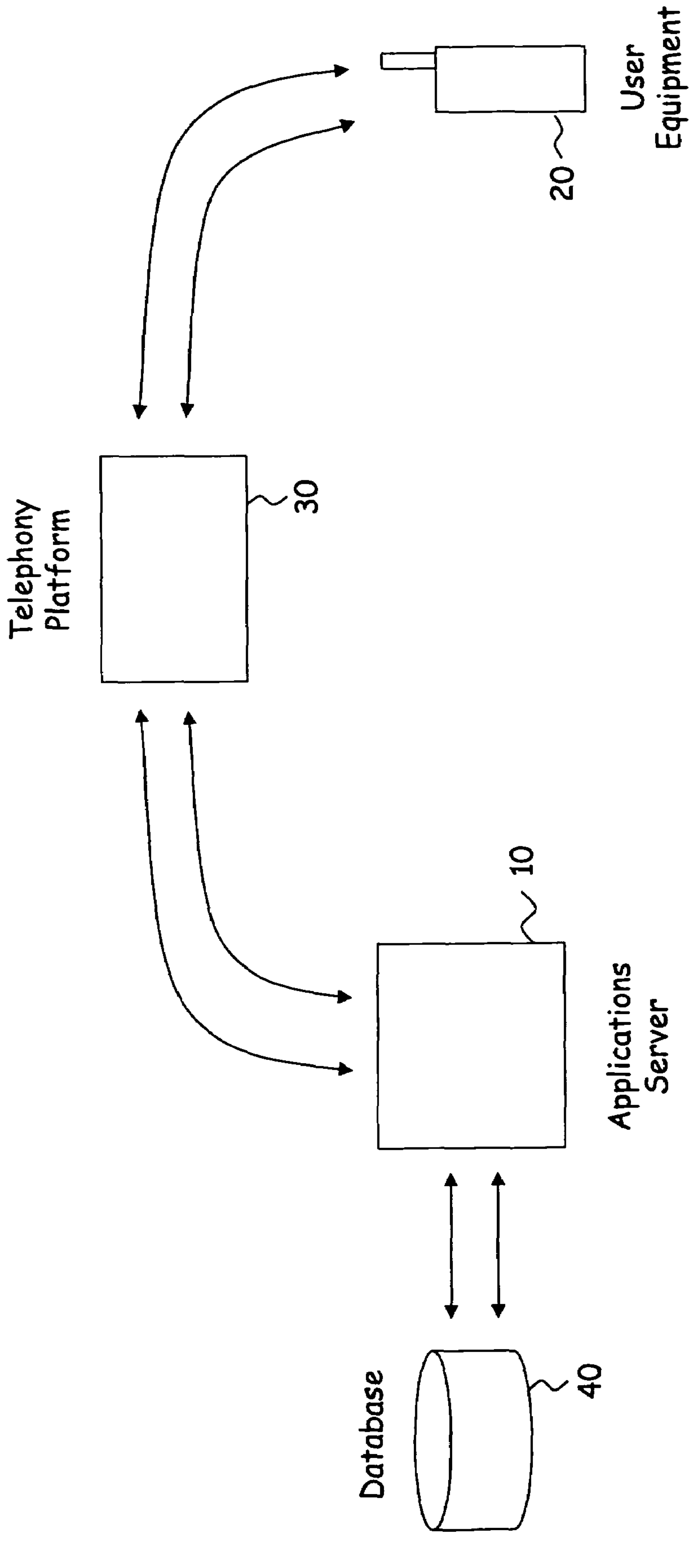
FIG. 1 is a schematic block diagram illustrating an arrangement for deploying an audio prompted service to a user.

An example embodiment of the present invention will now be described with reference to a voice-activated service. FIG. 1 provides a schematic block diagram illustrating an arrangement for deploying an audio prompted service to a user. The audio prompted service is provided by an application program running on a speech application server 10. The applications server 10 stores and retrieves data to and from a database 40. A user equipment 20 is arranged to communicate with a telephony platform 30. The telephony platform 30 is arranged to receive signals from the user equipment 20 representing user commands and to communicate signals representing audio prompts for communication to the user equipment, the signals being reproduced as audio prompts to the user, by the user equipment.

Embodiments of the present invention provide a facility for an audio based service, which in some examples allows a user to voice activate a service. The voice activation of the service is effected by providing voice commands in response to audio prompts for user command options. However in other examples the user commands may be provided by DTMF tones.

System Architecture

Figure 2:
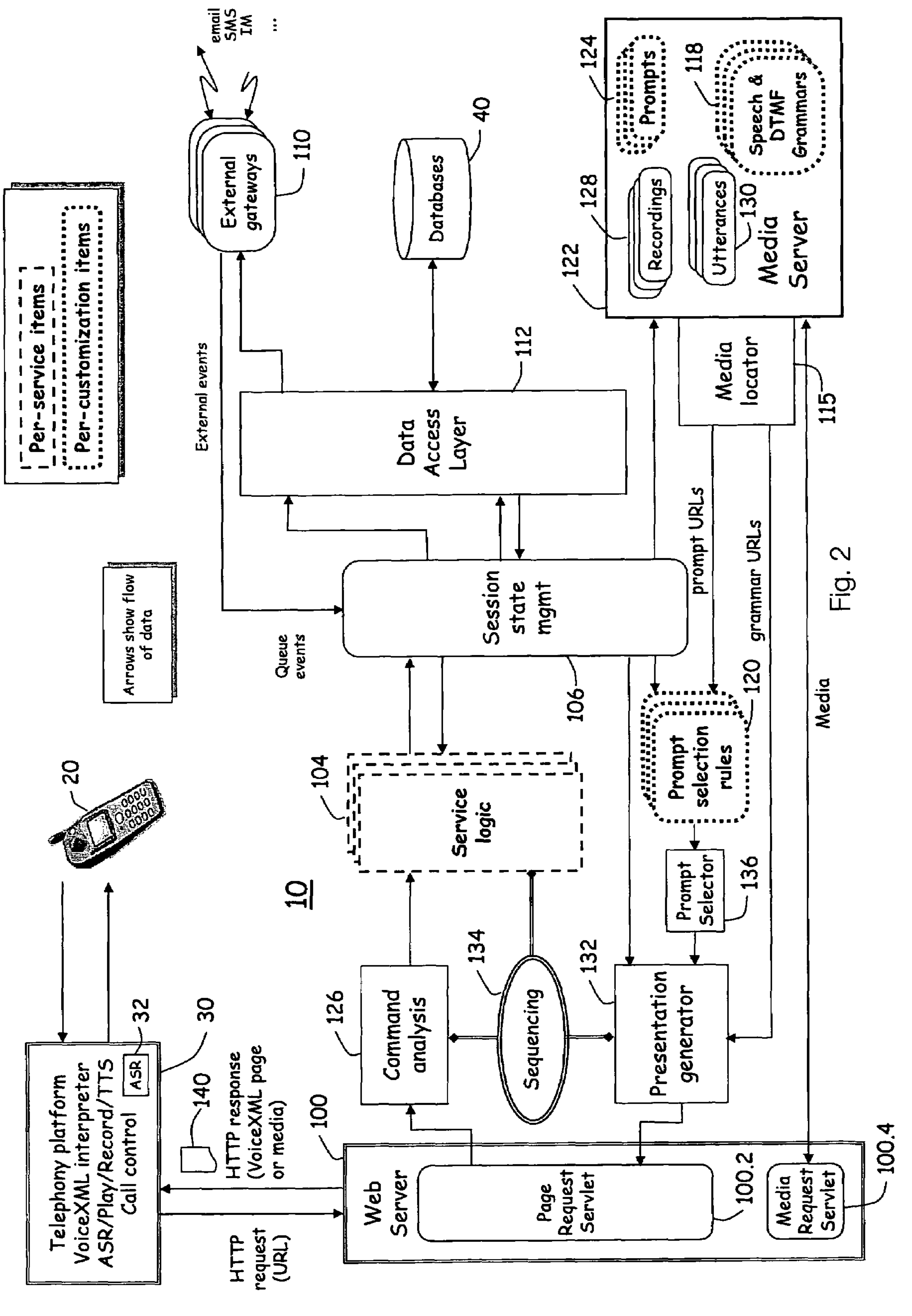
FIG. 2 schematically illustrates a more detailed representation of one possible run-time implementation of the arrangement of FIG. 1.

A diagram providing a more detailed representation of one possible run-time implementation of the speech applications server of FIG. 1 is shown in FIG. 2. In FIG. 2, parts which also appear in FIG. 1 have been provided with the same reference numerals. As illustrated in FIG. 2 the telephony platform 30 is arranged to receive markup data representing dialog execution code from a web server 100 within the speech applications server 10. As will be explained shortly, the telephony platform 30 receives the data representing dialog code in the form of VoiceXML pages which are generated by an application program running on the applications server 10.

The applications server 10 is arranged to provide a platform for running application programs for providing voice activated services to users. According to the present technique, the application program separates the rules for prompt selection from the service logic defining states of the application program, such states implementing the interactive dialogs to be carried out with the user.

A set of rules run by the prompt selection engine defines prompts to be generated for the user. The user responds to the prompts by uttering commands to specify the tasks to be performed by the service logic. An operative association between the state machine and the prompt selection is made at run time, so that the prompts to be generated for a particular state are established at run-time. As such the application program when executing on the applications server may be considered as comprising:

a state machine defining states of the application program and conditions for changing states from one of the predetermined set of states to another, some of the states initiating tasks specified by the users from user commands which serve to navigate through the states. The tasks also cause actions with various effects to be carried out, for example, sending of a message, updating an address book entry, etc a prompt selection rule set defining prompts to be spoken to the user in accordance with those rules, the prompts to be generated being selected in accordance with the current state of the application program As shown in FIG. 2 the application program when running on the applications server includes a command analyzer 126, for processing input user commands received at the web server from the telephony platform which in turn were generated by the user equipment 20. User commands processed by the command analyzer 126 are then fed to service logic 104 which provides the state machines for defining the service dialogs. A state machine engine represented by an oval 134 runs the state machine service logic 104 defining the state machine of the application program.

As will be explained, for each of the states of the application program defined by the state machine, the transition to the next state is determined by considering a combination of user input and session state. A session state manager 106 is therefore arranged to maintain information such as session history and the status of incoming and outgoing phone calls, and other information that may influence dialog flow. It also provides access to other information that affects dialog flow, including persistent data such as mailboxes, address books, and user preferences, along with externally originated events, such as the arrival of new email or instant messages. These items are accessed via a data access layer 112 which provides to applications an abstract facility for reading and writing persistent data and for sending messages in various media through messaging gateways 110. The session state manager 106 operates in a bidirectional fashion, so that service logic 104, when it reaches a state in which some action is to be carried out on behalf of a user, can issue a request to the session state manager 106 to perform the action. Most actions take place using the data access layer 112, and fall into one of two broad categories: updating persistent subscriber data, and sending messages such as email, SMS or Instant Messages via external gateways 110. One other main category of actions involves placing and managing phone calls; these operations are carried out on the telephony platform 30.

The data access layer 112 provides a facility for retrieving and updating data from databases and other data stores. The data access layer 112 is provided with access to data stored in a relational database 40 and may also be provided with access to XML data resources and other data stores such as:

LDAP user directories,

IMAP message stores, and

MAPI from Microsoft Exchange servers.

As mentioned above, the application server also includes a prompt selection engine 136 that is used by the presentation generator 132 for selecting audio prompts for communication to the user. The prompts, in an abstract form, are selected by the prompt selection engine 136 according to prompt selection rules 120 provided as part of the application program. The presentation generator 132 then consults the media locator 115 to convert the abstract prompts into Universal Resource Locators (URLs) which identify the locations of prompts in the form of recorded audio files 124 stored on a media server 122. The media locator 115 also provides URLs referring to speech and DTMF recognition grammars, which are used by the recognisers 32 on the telephony platform 30, and by the command analysis engine 126 to process user received commands and to generate a confidence score indicating how confident the command analysis engine 126 is that a particular command has been issued. The recognisers 32 and the command analysis engine therefore form a command recognition engine 32, 126. The confidence scores are used to provide an estimate of one of the possible commands provided by the grammar engine, which the user may have provided.

The application server also includes a presentation generator 132 which is arranged to assemble a VoiceXML page 140 which, when executed on the telephony platform 30, plays prompts to the user and receives input from the user in the form of speech or DTMF key presses. The presentation generator 132 is arranged to form the VoiceXML 140 page for presentation to the telephony platform 30 by consulting the results returned from the session state manager 106, the prompt selection engine 136 and the grammar locator, which is part of the media locator 115. The assembled VoiceXML page 140 may include one or more URLs to data objects such as audio prompt files 124 and speech and DTMF grammars 118.

The state machine 104 of the application program is arranged to ensure that the input handling processor 102 and the presentation generator 132 are maintained in a corresponding one of the predetermined states of the application program with respect to which particular actions are performed. The state of the application program is determined for the state machines 104 by the state machine engine 134.

The web server 100 includes a page request servlet 100.2 and a media request servlet 100.4. The page request servlet 100.2 is arranged to receive input in the form of URL requests from the telephony platform 30, such requests originating from the telephony platform in response to user-initiated events such as speech, DTMF key presses, and termination of the connection between the terminal device 20 and the telephony platform 30. The page request servlet 100.2 is further arranged to return responses to these URL requests in the form of VoiceXML pages 140 produced by the presentation generator 132. The telephony platform 30 interprets the received VoiceXML page in accordance with what is specified in the VoiceXML page 140. The telephony platform 30 then initiates further requests to the media servlet 100.4 to resolve URLs embedded in the VoiceXML page 140, these URLs referring to media stored on the media server 122. Once the received VoiceXML page 140 has been interpreted, and the media it references has been retrieved, the telephony platform uses the retrieved audio to play prompts to the user, and uses the retrieved speech or DTMF grammars to listen for input from the user.

In the system shown in FIG. 2, service logic, which defines the states of the application program for carrying out tasks for the user, is separated from prompt selection rules and also from the user commands which are recognised by the user command recognition engine 126+32. As illustrated in FIG. 2 those parts which are associated with providing the application program services, including the state machine 104, the prompt selection rules 120, the grammars for the command recogniser 126+32 and the prompt audio files 124 are illustrated with a dotted line border. The group of items consisting of the state machine 104, representing the service logic, along with the code that carries out the tasks associated with the service logic, is known collectively as a "service package". The group of items consisting of the grammars, the prompt selection rules, and the prompt audio files is know collectively as a "customization package", since it customizes the service as to such things as language, persona, and voice. The customization package can be adapted and deployed separately from the service package, and both types of packages can be adapted separately from those parts with a solid line, such as the presentation generator 132 and the command analyzer 126, which execute the application program to perform the service.

Voice-dial Service Example

Figure 3:
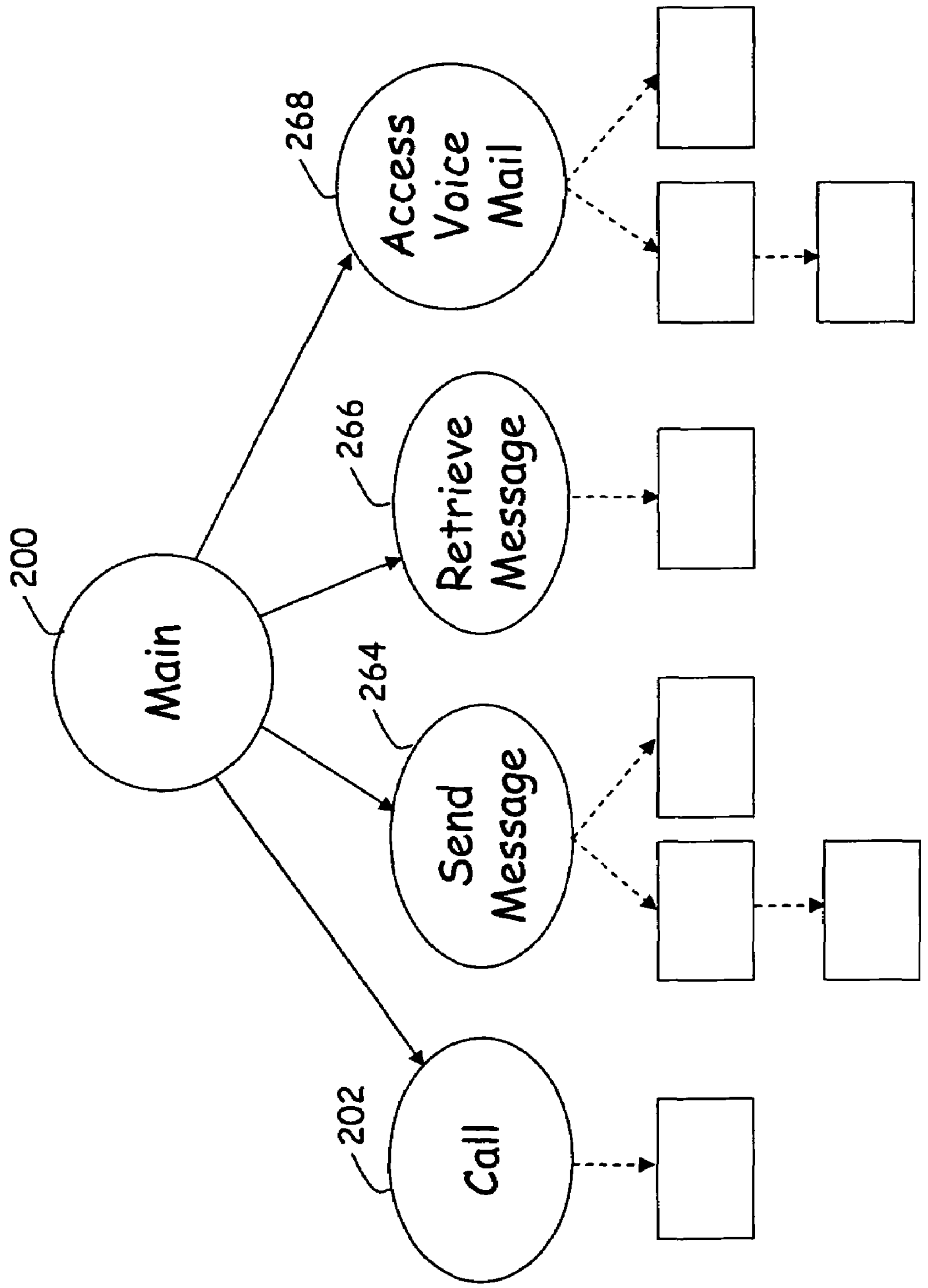
FIG. 3 schematically illustrates an example of various possible states of an application program.

An example service driven by voice activated user commands will now be explained with reference to FIGS. 3 to 5. As mentioned above, an application program operating in accordance with the present technique is specified as providing a plurality of states which define a sequence of actions and events which prompt a user through a menu of options for selecting a particular service. FIG. 3 provides an example of various possible states of an application program. Each oval-shaped state in FIG. 3 corresponds to a form in the application. A first state (top-level menu or form) labelled Main 200 defines a first state in a state diagram of the application program. Below the Main state 200 are options which a user can select in order to define the task which is to be performed. A first state labelled "Call" 202, defines a state starting a process for calling a particular contact in the user's contact list. Other examples given are "Send Message" 264, "Retrieve Message" 266 and "Access Voice Mail" 268 which are all states extending from the Main state 200 which can be selected by the user, and which define a first state in a set of states specifying a task to be performed. Thus, below each first level state 202, 264, 266 and 268 a further set of states is defined which prompt the user to provide user commands in order to navigate to a further state in which a task specified by the user in accordance with those user commands is to be performed. Consider the example of the "Call" task as specified from the first Call state 202.

Figure 4:
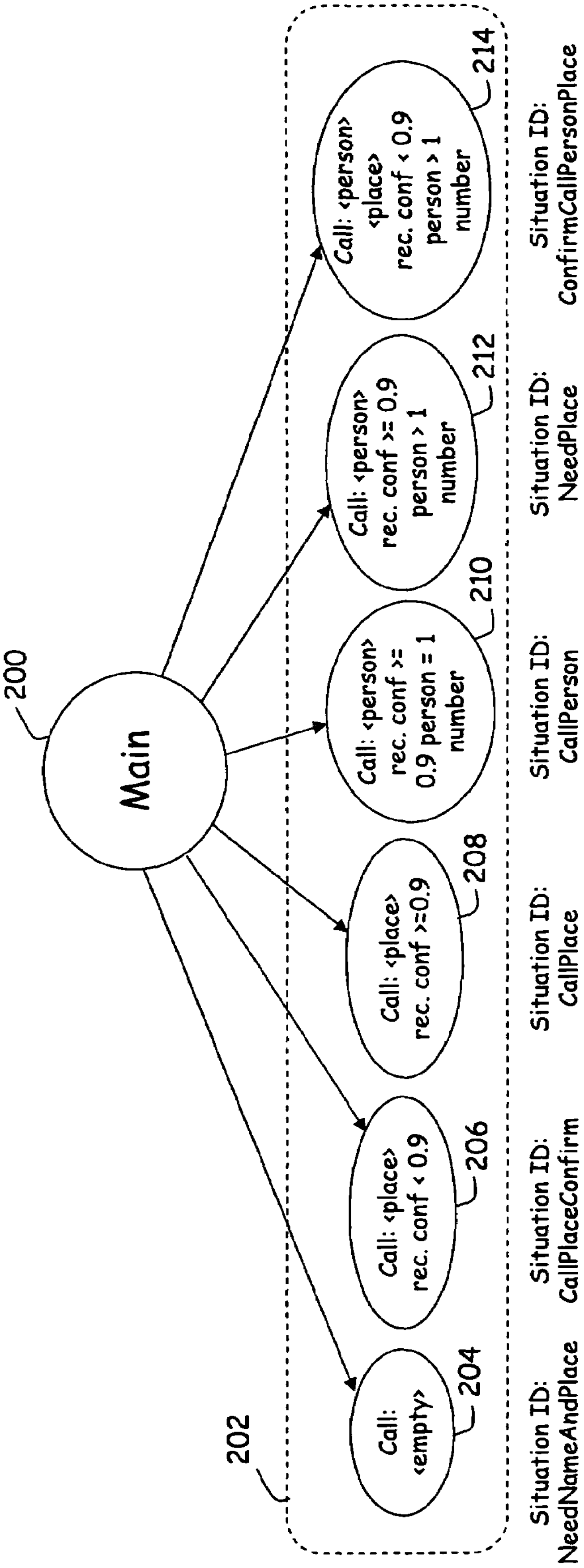
FIG. 4 schematically illustrates a more detailed example of further states which may appear within one of the states of FIG. 3.

FIG. 4 provides a more detailed example of further states, which may appear within the Call form 202. As shown in FIG. 4, within the Call form 202 various further states exist which may, according to one interpretation, represent sub states within the Call form 202. Navigation from the Main state (form) 200 to one of the sub states will depend upon the user command provided when navigating to the Call form 200. For example, in state 204 the user may have expressed the word "call" without specifying either the place to be called or the person to be called. Accordingly, state 204 is labelled call: <empty>. The following is a list of each of the states within the call state associated with the command issued by the user in order to reach this state:

Call: <place> 206, this state is reached if the user has specified call and "place", that is to say with a received confidence value of less than 0.9 the user specified a place where he wishes to place a call.

Call: <place> 208, this state corresponds to the call: <place> state 206 except that the confidence level returned by the user command recogniser 126+32 is greater than or equal to 0.9.

Call: <person> 210, this state is reached from the Main form 200 if the user uttered the word "call" followed by the person to be called where the command recogniser 126+32 has returned a confidence level for the confidence of detecting the person to be called of greater than or equal to 0.9 and where the person to be called has only one number, for instance a home number or a work number.

Call: <person> 212, this state is reached from the Main form 200 if the user uttered the word "call" followed by the person to be called where the command recogniser 126+32 has returned a confidence level for the confidence of detecting the person to be called of greater than or equal to 0.9 and where the person to be called has more than one number, for instance both a home number and a work number.

Call: <person> <place> state 214, this state is reached from the Main form if the user uttered the word "call" followed by the name of a person and the name of a place where the confidence level for both the person and the place is less than 0.9.

For the example illustrated in FIG. 4, a table illustrated in FIG. 5 provides a row for each of the states within the Call form 202. The first column of a row specifies only the dialog state, that is, the set of form slots that are filled in by the command recogniser, and the set of possible external events that may have occurred. The slot fills may be specified as specific values (for example, "Place" slot equals "Home"), or as "ANY", meaning that it only matters whether the slot was filled with some value, but not what the specific value was ("Place" slot equals "ANY"). In a second column, additional conditions for reaching that state are provided so that the state is fully defined by the logical conjunction of the first column (form slots) and the second column (additional conditions). In a third column a situation identifier is shown to define the state by means of a unique tag. Further, the table provides, in a fourth column 208 a prompt suggestion. The prompt suggestion is a guide to the person implementing the prompt selection rules, to give them a hint as to what should be said in the given situation. The prompt suggestion does not provide the prompts, which are determined at run-time according to the prompt selection rules. In the fifth column 230, a possible action to be performed is defined, and in the sixth column 232 instructions that set up the transition to the next dialogue state are provided. The instructions may directly specify a next state to be reached following the present state or often just specifies what grammar rule should be made active, which establishes a set of possible next dialogue states. It is in response to what the command recognition engine determines the user to have said, in conjunction with the evaluation by the session state manager 106 of the conditions in the second column 224, that a transition takes place to the next user interface state. Thus, for example, if the call: <empty> state 204 represented as the first row 204.1 is reached, then the prompt suggestion would be "call whom", and the transition setup would be "ask for place and person" in order for the voice activated service to identify the person and place where the user wishes to place a call.

For the example of where the call: <place> state 206 was reached, represented as the second row 206.1, the suggested prompt would request whether the specified place was correctly understood by the command recogniser, because the confidence that the place was recognised returned by the command recognition engine 126+32 was less than 0.9. Accordingly the transition setup would be to go to the "ConfirmCall" dialogue state. In contrast, if the state call: <place>208 had been reached, represented by the third row 208.1, then because the place was recognised with greater than or equal to 0.9 confidence level, the suggested prompt would inform the user that the call was being placed to <place>, an action would be performed to initiate the call and the transition setup would be to go to the "Background" dialogue state. The background state is a state in which the application program is idle except for monitoring whether the user expresses a "wakeup" word.

For the example of where the call: <person> state 210 was reached, represented as the fourth row 210.1, the suggested prompt informs the user that the call is being placed to <person>, the action is to initiate the call to the person, and the next state is Background, because the person has been recognised with a confidence score of greater than or equal to 0.9 and there is only one available number for that person. In contrast, where the call: <person> state 212 was reached, represented as the fifth row 212.1, the suggested prompt asks the user which of the <person>'s places to call, and the slot to be filled is <Place> because there is more than one number, corresponding to a particular place, associated with that person, and the particular place has not been specified. Accordingly, the transition setup specifies that a grammar for recognizing place names should be made active.

Prompt Selection at Run-Time

According to the present technique the prompt selection and rules pertaining to the prompt selection are specified in accordance with a situation based prompt mark-up language. The situation based prompt mark-up language defines a set of possible prompts to be selected for a given state (situation ID) of the application program in accordance with conditions for selecting that prompt as defined by the prompt selection rules 120. From the situation based mark-up language code is generated, such as Java code, for execution at run time by the prompt selection engine 136 shown in FIG. 2. As such, at run time the prompts are selected in a separate and disassociated way from the state machine 104, which merely determines whether conditions for changing from one state to another have been satisfied. As such the separation of the prompts and the prompt selection rules 120 from the state machine 104 is provided, which allows a designer to customise a particular service to a particular need such as style, formality, gender and language.

An example sequence for invoking prompt selection at run time may include the following steps:

1) The user utters a command phrase, or some other event, such as a called party hanging up the phone, occurs;

2) Based upon the slots of a dialog form which have been filled, and based on session state plus any external events which may have occurred, a current situation is determined;
3) A set of one or more prompt selection rules corresponding to the current situation is identified;
4) For each of the set of rules, the corresponding predicates are checked to determine a "winning" rule;
5) The prompt sequence for the winning rule is analysed in order to construct a list of audio file names (or text strings for text-to-speech generation);
6) A page of mark-up language to be transmitted to a client device is generated, the generated page including inserted prompts in the form of URLs based on the list of audio file names.

Service Blending

Figure 6:
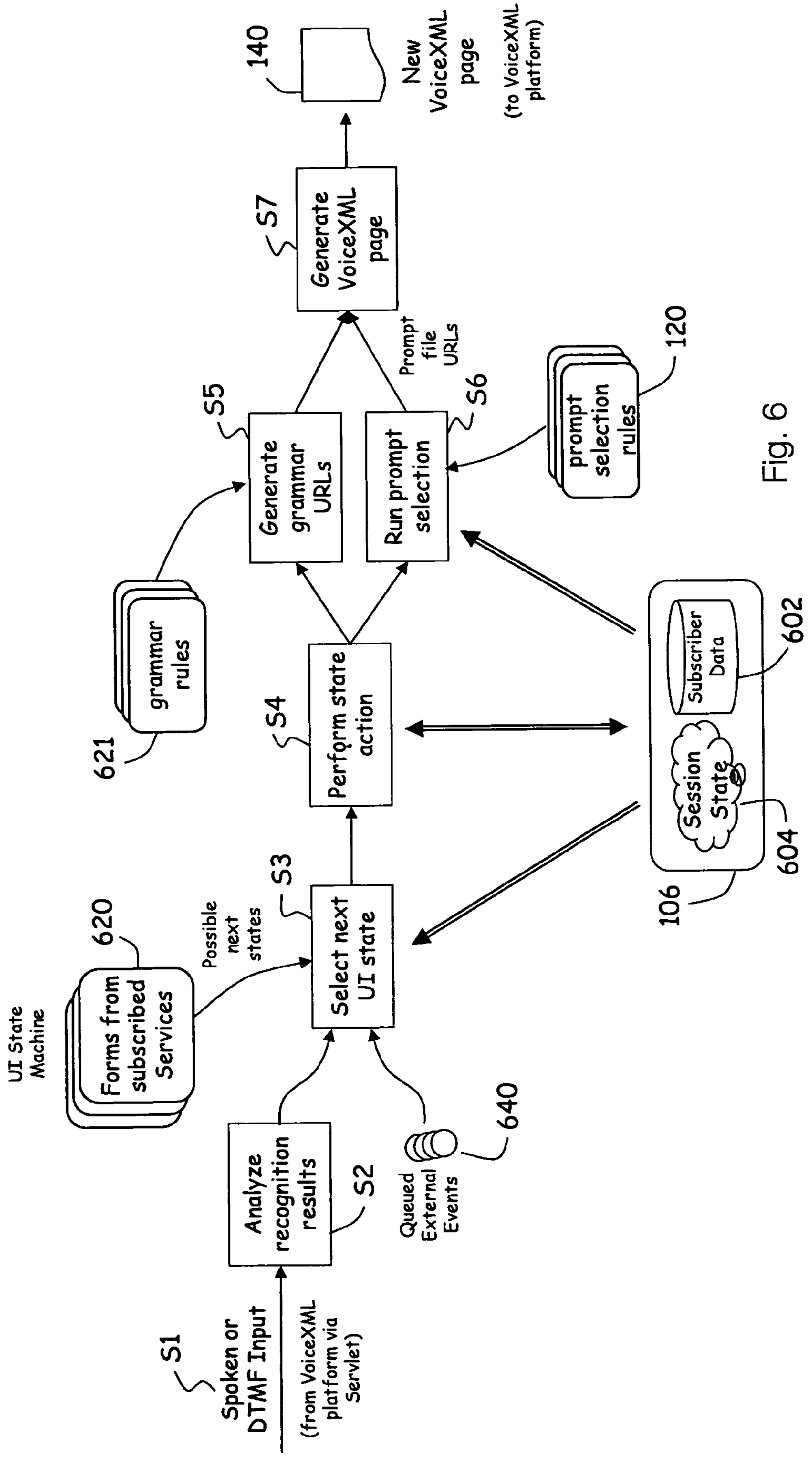
FIG. 6 schematically illustrates, for an application program comprising multiple services, the selection process for state transitions between different states in a form, or between a state in one form and a state in another form in response to user commands.

The application program may comprise only a single service, or may comprise a collection of services. One of the services comprising the application program must be designated as a base service, with such base service required to be deployed and provisioned for every user of the platform. The base service provides one or more states, which must include a Main state that constitutes an entry point into the application program. In general, each service will deliver some set of related features to a user. In either case, each service provided by the application program must include at least one customisation. The process for generating a VoiceXML page 140 to be returned to the telephony platform 30, with emphasis on the selection process for state transitions between different states in a form, or between a state in one form and a state in another form in response to user commands is described schematically in FIG. 6, with reference to FIG. 2. The page generation process commences at a step S1 where a user spoken input is received at the speech applications server 10 from the VoiceXML platform 30. The received speech input is then analysed by the speech applications server 10 (FIG. 1 and FIG. 2) at a step S2. The speech input analysis is carried out by the speech recogniser 32 and the command analysis engine 126 (FIG. 2), and may result in an identification of a specific command. At a step S3, the identified command is used in combination with the state machine engine 134 and a number of other factors to determine a next state within the state machine service logic 104 from the set of possible states. The set of possible states is the combination of all the states (situations) of all the forms 620 belonging to the services to which the user is subscribed. The other factors involved in the selection of a next state include session state 602 and subscriber data 604, along with any queued external events 640, as accessed using the session state manager 106. At a step S4, a state action, if any, associated with the selected next state is performed. The state action may include interaction with external data via the data access layer 112 and also interaction with subscriber data 602 and the session state logic 604 within the session state manager 106. At a step S5, grammar URLs are generated according to the next state transition setup instructions (the sixth column 232 in FIG. 5), which identify the grammar for possible responses from the user. The grammar is dynamically generated, based on the grammar rules 621 defined for the current form, from the combination of all customizations that contribute grammar rules to that form. In step S6, prompt selection rules 120 are run, to generate prompt URLs corresponding to the prompt chosen from among the possible prompts for the state selected in step S3. From the grammar URLs and the identified prompts, a VoiceXML page 140 is generated at step S7 by the presentation generator 132, to produce a new VoiceXML page associated with the newly selected state. The new VoiceXML 140 page is then sent to the VoiceXML platform 30 via the web server 100.

The subscribed services 620 will include at least a base service which represents the minimum basic functionality of the application program, and may also include one or more additional services representing additional functionality. The subscribed services 620 can be separately installed, removed and customised prior to run-time, and during run-time will determine a coherent set of service logic.

Figure 7A:
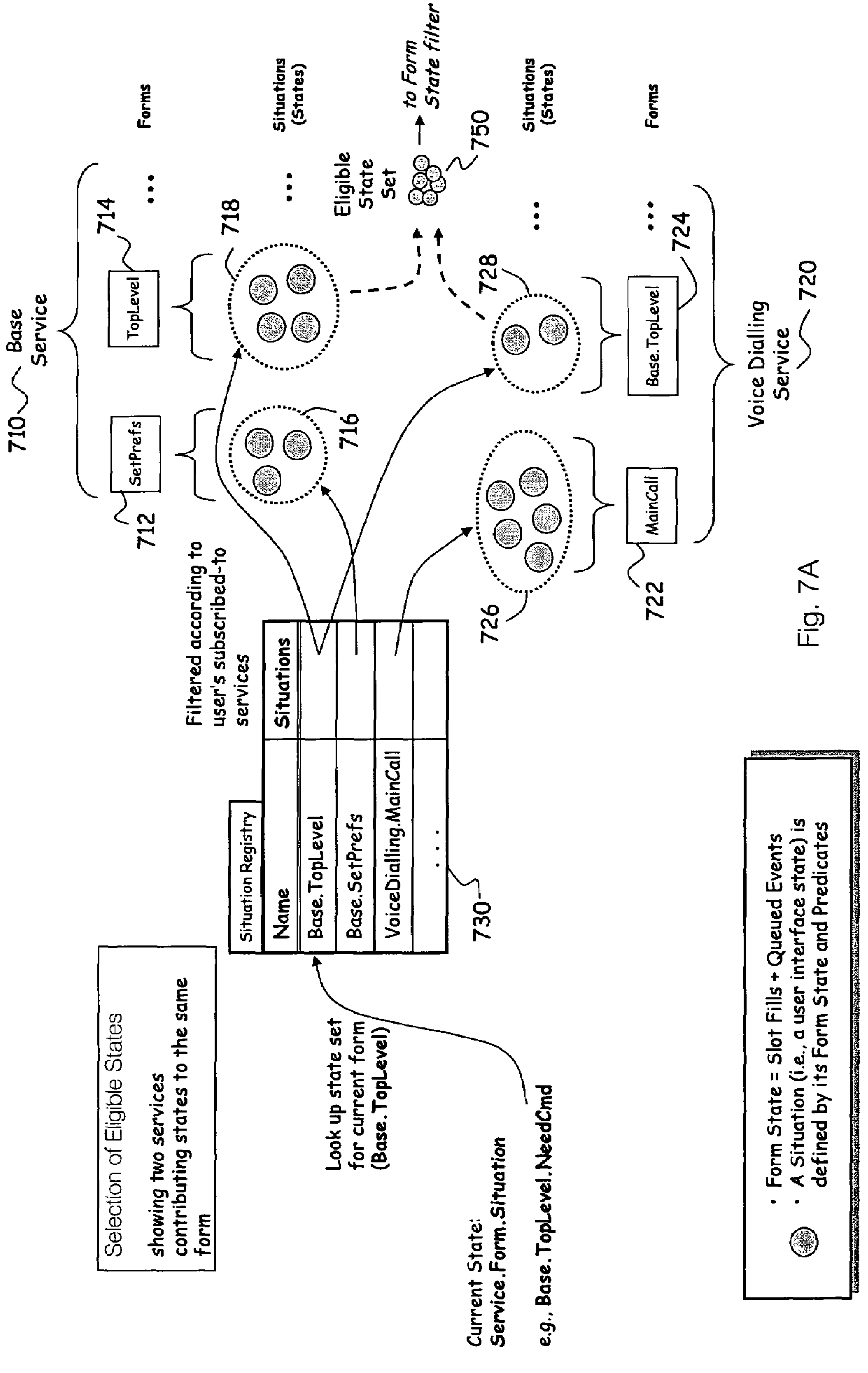
FIGS. 7A and 7B schematically illustrate the selection of eligible state sets from among the states within forms of currently subscribed services.

FIG. 7A schematically illustrates a process for the selection of states from separate services to define the service logic navigable by a user in terms of a set of eligible states. In the example of FIG. 7A, two services—a "Base Service" 710 and a "Voice Dialing Service" 720 are shown to contribute states to the same form. A situation registry 730 is provided and defines, for each form within each service (in this case the base service 710 and the voice dialing service 720), the situations (states) present within the form. In this example the base service 710 includes a "SetPrefs" form 712 and a "TopLevel" form 714. The SetPrefs form 712 includes a group of states 716 for setting user preferences within the application program. The TopLevel form 714 includes a group of states 718 representing a main menu which may for instance allow a user to select which service they wish to interact with and may define base service operations which can be performed from the main menu position within the service logic.

The voice dialing service 720 includes a "MainCall" form 722 and a "Base.TopLevel" form 724. The MainCall form 722 includes a group of states 726 for enabling a user to initiate a voice call to a third party. The Base.TopLevel form includes a group of states 728 to be combined with the TopLevel form states 718 of the base service 710. In other words, the Base.TopLevel form 724 constitutes a modification to a form within another service, in this case the TopLevel form 714 within the base service 710. The forms and corresponding situations within the situation registry 730 are filtered according to the services to which a current user is subscribed to generate an overall eligible list of states. The group of states 726 within the MainCall form 722 of the voice dialing service 720 are self contained within the present example and do not directly combine with any states within the base service 710. Accordingly, the group of states 726 can be passed to a Form State Filter to define part of the service logic as a discrete group. The same applies to the SetPrefs form 712 within the base service 710. In contrast, the group of states 728 within the Base.TopLevel form 724 of the voice dialing service 720 are arranged to be combined with the group of states 718 within the TopLevel form 714 of the base service 710 to define a modified TopLevel form comprising the eligible state set 750. The eligible state set 750 therefore comprises both state set 718 and state set 728. In general, when additional services are provided, the TopLevel menu of the base service will be adapted in this way to provide the user with access to the functionality of the additional services. (Note however that this combining of states is by no means limited to a TopLevel form. Any service can add states to, or override states of, any form of any other service.) The eligible state set 750 is then passed on to a Form State Filter described below with reference to FIG. 7B. In an alternative scenario, states within a service can be removed or replaced with a state from another service during the eligible state selection process.

Figure 7B:
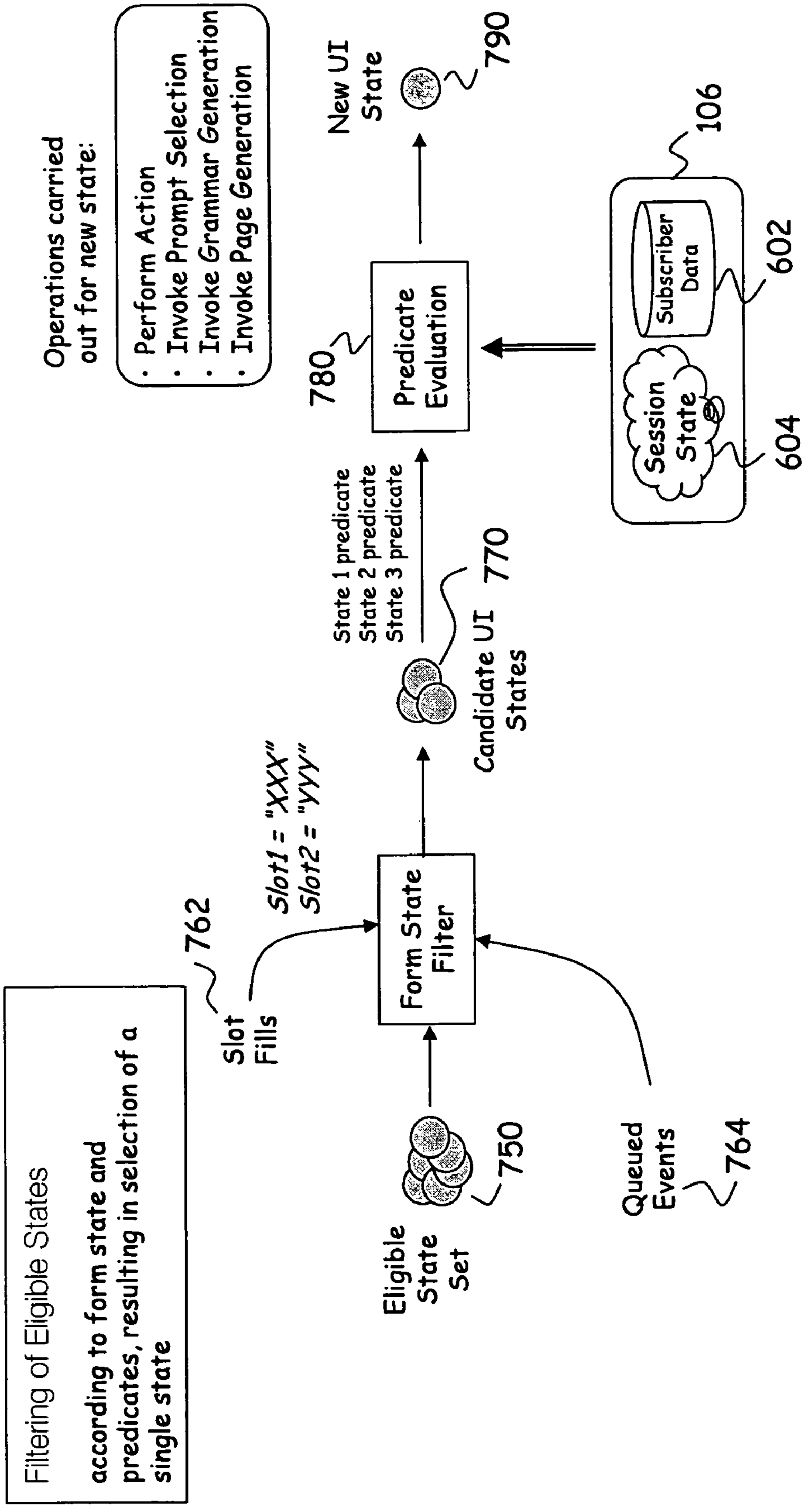

A filtering process for an eligible state set 750 generated in accordance with FIG. 7A is schematically illustrated in FIG. 7B. The eligible state set 750 is input to a Form State Filter 760 in which the eligible states consist of all the states defined for a form, taking into account that the states may have been contributed by more than one service. The Form State Filter 760, in response to the receipt of data 762 from the command analysis engine 126 filling one or more slots within the form, and in response to any currently queued events 764, generates a set of candidate user interface states 770, these being a subset of the eligible state set 750. The filtering is accomplished by comparing the slot fills and queued events with the "dialog state" column 222 of FIG. 5 to determine the best match among all the eligible states. The candidate user interface states 770 are then passed to a predicate evaluator 780. The predicate evaluator 780 evaluates the predicate of each candidate state, as specified in the second column 224 of FIG. 5. Each predicate specifies Boolean conditions that must be true in order for the predicate to be considered true. The predicate evaluator 780 will determine whether the predicate for each candidate user interface state is true using the session state information 604 and the subscriber data 602. Where the predicate evaluates to true for only one of the candidate user interface states 770, that state will be set as the new current user interface state 790. Where the predicate evaluates to true for more than one of the candidate user interface states 770, a tie-breaker algorithm is applied to select one of these states as the new current user interface state 790. The tie-breaker assigns different weights to different states according to whether the state was defined within the service to which the current form belongs or to another service that is extending the form, and also according to whether the states belong to local or global forms.

Once a new current user interface state 790 is selected, a corresponding action may be performed, and prompt generation, grammar generation and page generation can be invoked, as described previously.

In addition to updating the service logic 104 on the introduction of a new service package, new customization packages may be introduced to update the command recognition grammars 118, prompt selection rules 120, and audio 124. By modifying the service logic 104 and command recognition grammars 118, a new service can accomplish several things, including adding new commands to the set of valid commands, overriding the handling of existing commands, handling new events, and overriding the handling of existing events.

Service Blending Example

Figure 8:
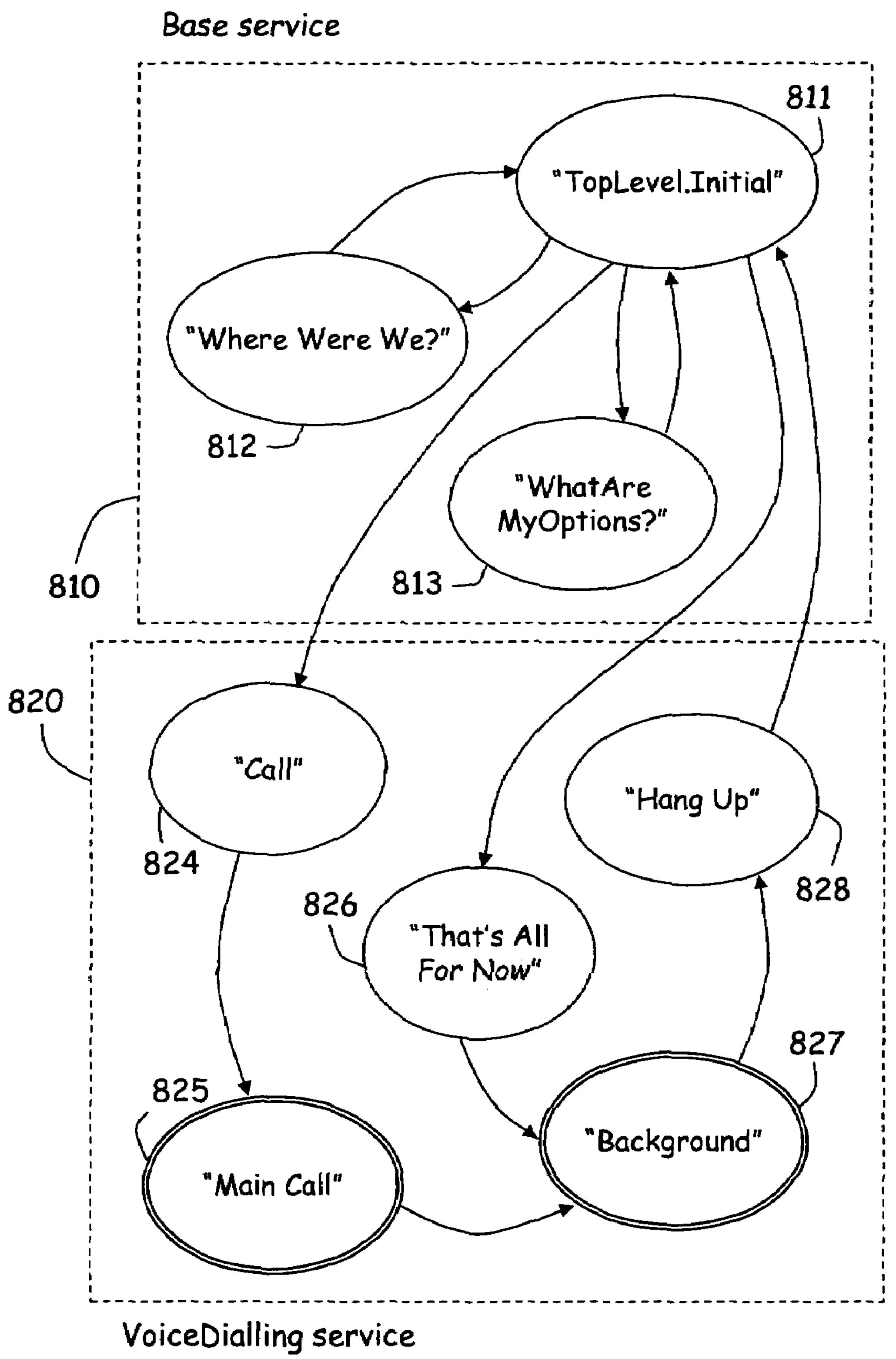
FIG. 8 schematically illustrates linked service logic for two separately defined services.

FIG. 8 schematically illustrates an example set of run-time state logic for blended services. In this example, two blended services are illustrated, but it will be appreciated that any number of services can be blended together in this way, and that much more sophisticated effects can be achieved than shown here. In the present example, the blended services are a base service 810 and a voice dialing service 820. In FIG. 8, single states (situations) are represented by ellipses having a single border, whereas forms, each of which contains a number of single states, are represented by ellipses having a concentric double border.

The base service 810 provides basic functionality to a user. The base service 810 includes a top-level "Initial" state 811 which is the state within the service logic where a user begins upon the initiation of the service prior to any change of state having occurred. The base service 810 also includes a "Where were we?" state 812 which provides a user with a reminder of their current logical position within the service logic, and a "What are my options?" state 813 which provides the user with an indication of those options which are currently available to him at his current position within the service logic.

The base service 810 is enhanced by additional functionality provided by the voice dialing service 820. The voice dialing service 820 enables the user to initiate a call by providing voice commands indicating a desire to place a call, and indicating a recipient and possibly a location of the recipient. The voice dialing service 820 includes a "Call" state 824 for initiating a call task by providing an entry point into the "Main Call" form 825 which provides further service logic for ascertaining sufficient information from the user to make a call. Once the call has been made, the current position of the user within the service logic passes to a "Background" form 827 and back to the "Initial" state 811 via a "Hang-up" state 828 in which the user terminates a currently active call.

The voice dialing service also includes a "That's all for now" state, which enables the user to suspend current activity within the voice dialing service 820 by transitioning to the "Background" form state 827 and reverting back to the "Initial" state 811 via the "Hang-up" state 828 within the voice dialing service or the wakeup word state within the base service. The curved arrows between states in FIG. 8 represent allowable state transitions. Allowable state transitions are defined by a combination of the state logic and the grammars generated by the grammar engine. All of these states and the possible state transitions may be defined prior to run-time using a suitable mark-up language. An example of such a mark-up language is described in Annex A with reference to FIGS. 9A and 9B.

An example mark-up language, according to the present technique, for defining the states of a state machine of an application program for deploying services to users groups states together into forms, in which the states share a common context. The portions of mark-up language used to define the separate services, for instance the base service 810 and the voice dialing service 820 are separate. However, any given service is able to define new states and state transitions within another service. In the present case the voice dialing service defines states and state transitions within another service. This is done without changing the code of the other service, even though the new states and state transitions may be specified as "owned" by the other service. In some cases, two services may be stand-alone, but may be able to modify each other to provide linked services. In other cases, one service may depend on the presence of another service to function.

FIGS. 9A and 9B illustrate mark-up language code fragments representing a base service (such as the base service 810 described in relation to FIG. 8) and an additional service (such as the voice dialing service 820 described in relation to FIG. 8) using a user interface description mark-up language (UIML).

The code of FIG. 9A describes a "TopLevel" FORM 900 having a type "dialog". The form 900 is defined by the IDLESTATE element 905 to represent a location within the service logic to which a transition to a return to an idle or non-active state will be made when a task is completed.

Within the FORM 900 there is a SITUATION 910 referred to as the situation ID "PromptForNoFireCommand". This is the initial situation of the TopLevel FORM 900, and becomes active when a transition to that FORM 900 takes place with no form slots filled in. The SITUATION 910 includes an OPERATION element 912 which defines the logic which executes for the SITUATION 910 and which houses a PROMPT element 914 for requesting that the prompt selection engine generate a suitable prompt corresponding to the current SITUATION. A contextual suggestion of the subject of the prompt is specified by the COMMENT element. The OPERATION element 912 also houses a TRANSITION element 916 which specifies an ASK element which determines that a recognition should occur using a grammar RULE "TopLevel" in the service "NoFire". Use of this grammar rule ensures that the dialog context will remain within the TopLevel FORM 900.

A second SITUATION "NoFireWWW" 920 is set out below the SITUATION 910 and allows a user to determine his position within the service logic of the services. The structure of "NoFireWWW" 920 is similar to the structure of "PromptForNoFireCommand" 910 but additionally includes a CONDITION element 922 which acts as a container for conditional logic relating to the present situation. In this case, the CONDITION element includes a FORMSTATE element, which is used to determine whether or not the SITUATION 920 is to be executed. This is done by specifying a slot within the form, which needs to be filled with a predetermined value (in this instance the phrase "Where were we?") in order for the CONDITION element to be satisfied. The slot and the predetermined value are defined by a FIELDS element 924.

An OPERATION element 926 in "NoFireWWW" includes an ACTION element containing a FIELDS element 928 which specifies that the field "NoFire_EndOfTask" should be cleared. A PROMPT element requests that the prompt selection engine generate a suitable prompt representing the current SITUATION. A contextual suggestion of the subject of this prompt is specified by the COMMENT element 929 contained within the PROMPT element. The TRANSITION element provided is identical to that provided for in the "PromptForNoFireCommand" SITUATION, ensuring that the dialog context will remain within the TopLevel FORM 900.

A third SITUATION "NoFireWAMOTopLevel" 930 allows a user to find out what options are currently available to him at his present position within the service logic. The structure of "NoFireWAMOTopLevel" 930 is similar to the structure of "NoFireWWW" 920 except that the FORMSTATE 932 uses the field "NoFire_Global" and the value "WhatAreMyOptions" to determine whether the conditional logic is satisfied. The corresponding ACTION 934 operates to clear the field "NoFire_Global" and the corresponding TRANSITION 936 specifies an ASK element 938 which determines that a recognition should occur using a grammar RULE "TopLevelWAMOAndLWW" in the package "NoFire".

The code of FIG. 9B modifies the service logic provided for by the code of FIG. 9A. A FORM element 950 is provided which specifies a FORM name, package and type which show that this code provides states and state transitions relating to the same form as the code of FIG. 9A. Although the present FORM may include a number of SITUATIONS, for the sake of brevity only a SITUATION "SaidCallCmd" 952 has been described. A FORMSTATE 955 in this case includes an ALLOF element 960 which requires all of the FIELDS elements contained therein to be satisfied. Specifically, in this case a "NoFire_TopLevel" field (slot) 962 must be equal to a value "Call" and a pseudo-field "ZERO-OR-MORE" 964 must be equal to a value "ANY". This formstate specifies that the command given must be "Call", and that any number of other slots in the Base service TopLevel FORM may be either unfilled or filled with any values. A PREDICATE 965 relating to the SITUATION 952 includes an INVOKE element 970 for calling a method and an ARGUMENT element 972 for passing an argument value to the method. An ACTION element 980 includes two INVOKE elements 982, 984 for calling two methods and two FIELDS elements 986, 988 for setting field values within the FORM. The OPERATION element further includes a PROMPT element 989 for requesting that the prompt selection engine generates a suitable prompt representing the current SITUATION, and a TRANSITION element 990 which uses a GOTO element 992 to specify "MainCall" as a next form to activate and a number of PARAM elements 994 to pass parameters to the "MainCall" form, which is part of the VoiceDialing service, as indicated by the "package=VoiceDialing" attribute of the GOTO element.

Generally, a service extends or modifies forms of an existing service by specifying situations that add to or replace situations in forms belonging to the other service. For example, if service A is required to add a new situation to a form in service B, then service A should describe a situation with a name like "serviceB.formX.SituationID". In order to provide a prompt to be played in that situation, customisations of service A should also specify prompt selection rules for the situation. A customization of a service may also extend grammars of other services, in which case the customisations of the service should specify the additional grammar rules. By modifying the situations and grammars of another service, a new service can add handlers for new events, or override the handling of existing events, add new choices to a forms menu, or override the handling of existing choices, or add entirely new fields to a form belonging to another service.

In some embodiments the applications the forms, their constituent situations, and the grammar rules defined by each of the modular services are contained within a software package that is installable and deployable independently from any other modular service package, the combination of all the forms, situations, and grammar rules of each of the modular services collectively defining the state machine and command menus of the application program within which the modular services exist. Furthermore, each user of an application program may subscribe to a different subset of the services of the application program, such that only the features, menus, commands, and prompts of the subscribed-to subset are available to the user at run-time.

In some examples, the service name portion of a situation identifier may identify a service other than the service whose package contains the situation, that other service being the service with which the form is associated at run-time, and wherein the form name portion of the situation identifier is the same as the name of some form contained in the other service. Furthermore, the service name portion of a grammar rule may identify a service other than the service whose package contains the grammar rule, that other service being the service with which the grammar rule is associated at run-time. The rule name portion of the grammar rule identifier may be the same as the name of some grammar rule contained in the other service, the items in the grammar rule thereby being added to the identically named grammar rule in the other service, the grammar rule thereby extending at run-time the menu of possible user commands that can be recognised at a given point in the dialog of the other service.

The situation name portion of the situation identifier may be the same as the name of a situation in the identically named form in the service with which the form is associated at run-time, the situation thereby replacing at run-time the definition of the situation as contained in the modular service package of the service with which the form is associated at run-time, the situation thereby replacing the state in the set of eligible states for users who subscribe to the service whose package contains the situation. Alternatively, the situation name portion may be different from the name of any situation in the identically named form in the service with which the form is associated at run-time, the situation thereby extending at run-time the form to add a new situation to those defined in the modular service package of the service with which the form is associated at run-time, the situation thereby being added to the set of eligible states for users who subscribe to the service whose package contains the situation.

Various modifications may be made to the embodiments herein before described without departing from the scope of the present invention. It will be appreciated that an aspect of the present invention is a computer program, which when used to control an applications server carries out the methods described herein.

The invention claimed is:

1. An applications server operable to provide a plurality of modular user driven services by running an application program, the application program being arranged to provide the modular services in response to user commands for selecting service options, the applications server comprising in accordance with the application program a state machine operable by a state machine engine to determine a current state of the application program from one of a pre-determined set of states defining a logical procedure through the user selected service options, the states of the state machine including for each of the modular services, one or more states defined by one or more forms within the service, each form defining a state of a user interface for providing the services to the user, and each state including one or more sub-states representing situations, defining the commands to be recognized and conditions to be satisfied to select each sub-state depending upon the estimated user commands and the session state of the user session, a command recognition engine, the command recognition engine including a grammar processor operable to provide the command recognition engine with grammar rules to establish a set of possible user commands which can be provided for a particular state, the possible user commands constituting a menu of available user commands for each form, the possible commands determining the states which can be reached from the current state, the command recognition engine being operable in response to a received user command to provide the state machine engine with an estimate of at least one of the possible commands, which the user may have provided, the state machine being operable to change state in response to the estimated user command, wherein the state machine is operable to determine at run-time a set of eligible states and the possible transitions between the states, the grammar processor being operable to adapt the possible user commands to be recognized for a current state in association with the state transitions, which are determined at run-time.

2. An applications server as claimed in claim 1, wherein the state machine engine includes a state sequencer operable to determine at run-time a set of eligible states from among all the states defined by the state machine of the application program, the state sequencer being arranged to determine at run-time the possible state transitions among the eligible states.

3. An applications server as claimed in claim 1, wherein the set of eligible states for a given user comprises the situations associated with the current and global forms, filtered to include only the situations contained in the modular service packages of the services to which the user subscribes.

4. An applications server as claimed in claim 1, wherein each situation is labelled with a unique identifier, the identifier consisting of the name of the situation, the name of the form of which the situation is a sub-state, and the name of the service with which the form is to be associated at run-time.

5. An applications server as claimed in claim 1, wherein each grammar rule is labelled with a unique identifier, the identifier consisting of the name of the rule and the name of the service with which the rule is to be associated at run-time.

6. An applications server as claimed in claim 1, wherein each situation has associated therewith the user commands to be recognized, and the conditions to be satisfied, in order for the state machine engine to consider that state for selection.

7. An applications server as claimed in claim 1, wherein each situation has associated therewith instructions for enabling transitions to the next state, some of the possible instructions including, an instruction to make a transition to a different user interface form, or an instruction to perform a recognition operation with respect to a specified grammar rule or rules, the grammar rule or rules determining the set of possible user commands to be recognized, the set of possible user commands determining the possible transitions to a next state.

8. An applications server as claimed in claim 1, wherein the state machine engine is operable to determine the next state in the state machine by filtering all eligible states with respect to the user commands which were recognized, and also with respect to the situation conditions that are satisfied, and finally, if the filtering does not result in the selection of a unique state, applying a tie-breaker algorithm to select a single state from among the states resulting from the filtering process.

9. An applications server as claimed in claim 1, wherein the state machine is defined using a mark-up language, the mark-up language including a form instruction for defining the form of the state within the corresponding service, each form instruction providing the logical conditions for changing to the following state, a situation instruction for defining the sub-states of a form within a corresponding service, each situation instruction providing the logical conditions for the state machine engine to consider selecting that situation as the current state.

10. An applications server as claimed in claim 1, comprising a prompt selection engine operable to execute a prompt selection rule set to provide audio prompts for prompting the commands from the user in accordance with the rules, wherein the rules determine the prompt to be selected in accordance with a current state of the state machine, the rules being evaluated at run-time.

11. An applications server as claimed in claim 1, wherein the command recognition engine is operable to determine a confidence level for the estimated user command, the state machine identifying the change of state from the estimated user command in combination with the determined confidence level, with respect to the conditions for specifying the next state identified by one or more of the situations within a form of the current state.

12. An applications server as claimed in claim 11, wherein the user commands include voice commands, the command recognition processor including a command analyser operable in response to signals received from a speech recognition processor to generate confidence levels for the estimate of a command provided by the user, the possible user commands being possible voice commands.

13. An applications server as claimed in claim 1, wherein the application program is operable to generate a mark-up language page in accordance with a current state of the application program as determined by the state machine, the mark-up language page including universal resource locations (URLs), one or more of the universal resource locators defining a location for data files providing the audio prompts, and one or more of the universal resource locators defining grammars to be generated.

14. An applications server as claimed in claim 1, wherein the applications server is coupled to a system, the system comprising a telephony platform and a user equipment, the user equipment being operable to receive data representative of audio signals from the telephony platform, the telephony platform generating the audio signal data in accordance with the service being provided, the user equipment generating audio signals for the user, to receive commands from the user, and to communicate the commands to the telephony platform.

15. A method of providing a plurality of modular user driven services using an application program run by an applications server, the modular user driven services being provided in response to user commands for selecting service options, the method comprising determining a current state of the application program from one of a pre-determined set of states defining a logical procedure through the user selected service options, the states of the application program including for each of the modular services, one or more states associated with one or more forms within the service, each form defining a state of a user interface for providing the services to the user, and each state including one or more sub-states representing situations, defining the commands to be recognised and the conditions to be satisfied to select that state depending upon the estimated user commands and the session state of the user session, providing a set of possible user commands which may be provided for a particular state, the possible commands determining the states which may be reached from the current state, providing in response to a received user command an estimate of at least one of the possible commands, which the user may have provided, and changing from a current state to another of the states of the application program in response to the estimated user command, wherein the determining the current state of the application program includes determining at run-time the set of eligible states and the possible transitions between the states, and the providing the set of possible user commands includes adapting the possible user commands to be recognised for a current state in association with the state transitions determined at run-time.

16. A method as claimed in claim 15, wherein the determining at run-time the set of eligible states for a given user comprises adding to the set all the situations of the current form contained in the modular service package of the service with which the current form is associated, adding to the set all the situations associated with the current form contained in the modular service packages of services other than the service with which the current form is associated, adding to the set all the situations of all global forms, taking into account situations contained in the modular service packages of all services that contribute situations to global forms, finally, removing from the set all situations except those contained in the modular service packages of the services to which the user subscribes.

17. A method as claimed in claim 16, wherein the determining the possible transitions between states at run-time comprises for each situation in the set of eligible states examining the transition instructions associated with the situation, if the transition instruction specifies a transition to a different form, establishing a possible transition between the situation and the initial situation of the different form, if the transition instruction specifies a recognition operation with respect to a grammar rule or rules, establishing possible transitions between the situation and all the situations in the same form, and in all global forms, whose form state matches one or more of the possible user commands that can be recognized.

18. A method as claimed in claim 15, wherein each situation has associated therewith the user commands to be recognized, and the conditions to be satisfied, in order for the state machine to consider that state for selection.

19. A method as claimed in claim 18, wherein the determining the next state of the state machine comprises determining the next state in the state machine by filtering all eligible states with respect to the user commands which were recognized, and also with respect to the situation predicates that are satisfied, and finally, if such filtering does not result in the selection of a unique state, applying a tie-breaker algorithm to select a single state from among the states resulting from the filtering process.

20. A computer program stored on a computer readable medium which when loaded onto a data processor causes the data processor to perform a method of providing a plurality of modular user driven services using an application program run by an applications server, the modular user driven services being provided in response to user commands for selecting service options, the method comprising determining a current state of the application program from one of a pre-determined set of states defining a logical procedure through the user selected service options, the states of the state machine including for each of the modular services, one or more states associated with one or more forms within the service, each form defining a state of a user interface for providing the services to the user, and each state including one or more situations defining the commands to be recognized and the conditions to be satisfied to select that state depending upon the estimated user commands and the session state of the user session, providing grammar rules to establish a set of possible user commands which may be provided for a particular state, the possible commands determining the states which may be reached from the current state, providing in response to a received user command an estimate of at least one of the possible commands, which the user may have provided, and changing from a current state to another of the states of the application program in response to the estimated user command, wherein the determining the current state of the application program includes determining at run-time the set of eligible states and the possible transitions between the states, and the providing the set of possible user commands includes adapting the possible user commands to be recognized for a current state in association with the state transitions determined at run-time.

* * * * *

UNITED STATES PATENT AND TRADEMARK OFFICE

CERTIFICATE OF CORRECTION

PATENT NO. : 7,634,259 B2
APPLICATION NO. : 11/378579
DATED : December 15, 2009
INVENTOR(S) : Shienbrood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Ninth Day of November, 2010

David J. Kappos

*Director of the United States Patent and Trademark Office*